Jan. 25, 1966   A. SERAFINI   3,231,138
HANDLE AND SPOUT DEVICE
Filed Jan. 6, 1964
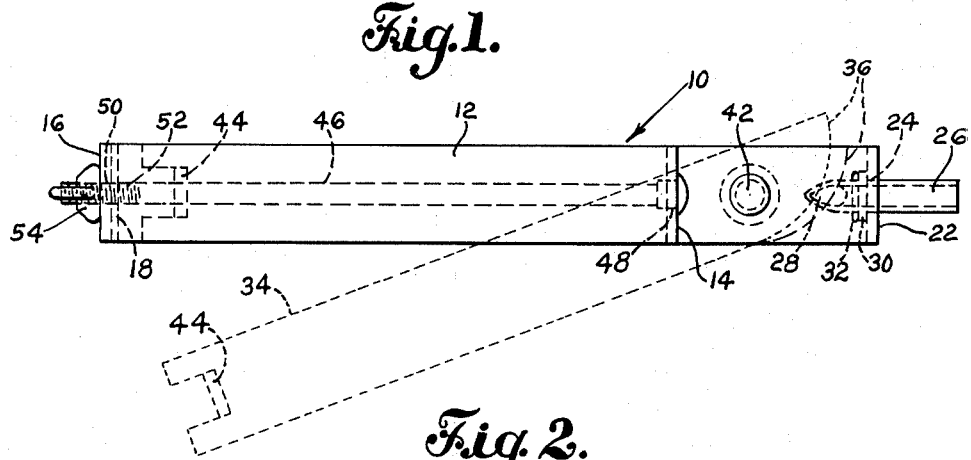
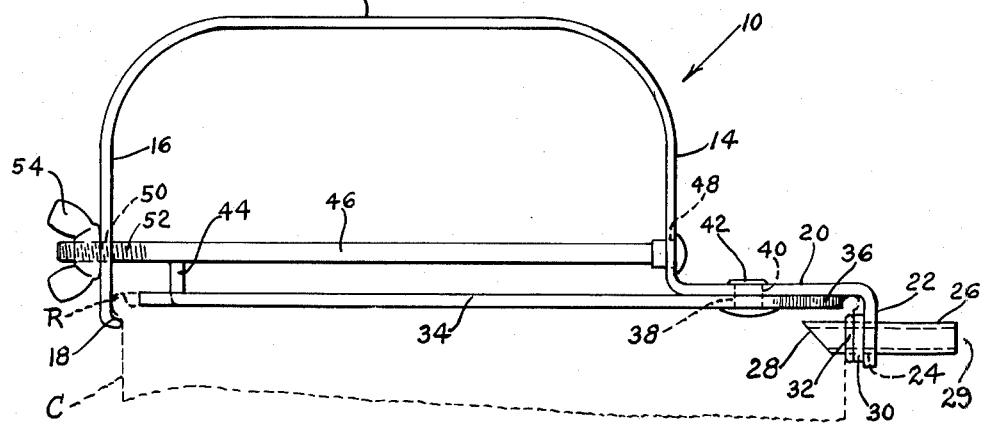
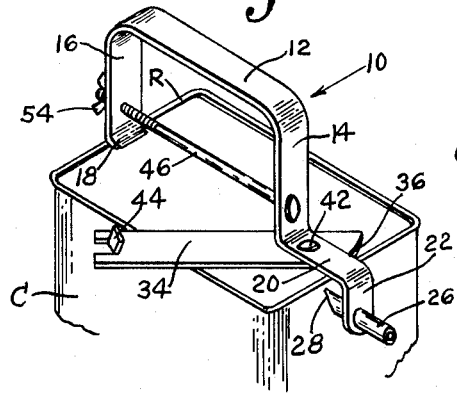
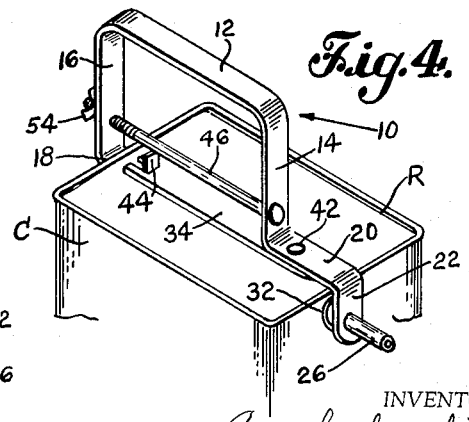
INVENTOR.
Angelo Serafini
BY Harold E. Cole
Attorney

United States Patent Office 3,231,138
Patented Jan. 25, 1966

3,231,138
HANDLE AND SPOUT DEVICE
Angelo Serafini, Boston, Mass.
(33 Faywood Ave., East Boston, Mass.)
Filed Jan. 6, 1964, Ser. No. 335,965
6 Claims. (Cl. 222—83)

This invention relates to a device that provides a spout for pouring and also a handle by which to hold a container.

One object of my invention is to provide a device that provides a spout at the side of a can or other container and also a handle extending above the top of the container.

Another object is to provide said device with a lever, and a spout with a penetrating portion, whereby actuation of the lever causes the spout to penetrate the container to thus provide a discharge opening therethrough.

Still another object is to provide a mounting member connected to the handle and to which the lever is pivotally attached, and which mounting member also includes a support for the spout.

A further object is to provide such a lever that normally is in an obscure position parallel with and below the handle.

A still further object is to provide such a device that is formed of only a few simple parts, that can easily and economically be assembled into the final form taken by my device.

The foregoing and other objects which will appear as the nature of the invention is better understood, may be accomplished by a construction, combination and arrangement of parts such as is disclosed by the drawing. The nature of the invention is such as to render it susceptible to various changes and modifications, and therefore, I am not to be limited to the construction disclosed by the drawing nor to the particular parts described in the specification; but am entitled to all such changes therefrom as fall within the scope of my claims.

In the drawing:

FIG. 1 is a top plan view of my device, showing the lever in dash lines extending diagonally outward.

FIG. 2 is a side elevational view of my device in fully mounted position on a container, the dash lines indicating a portion of the container.

FIG. 3 is a perspective view showing my device in position ready to penetrate the side of a container by movement of the lever.

FIG. 4 is another perspective view showing my device attached to and in tightened position on a container ready for pouring.

As illustrated, my handle and spout device has a holder 10 having an upper handle or grasping portion 12 with two legs 14 and 16 at opposite ends thereof. At the end of said leg 16 is a turned-in, gripping lip 18 to grip the outer bead or rim of a container C such as a gallon can. Extending angularly beyond said leg 14 is a mounting member 20 having at one end an angularly extending spout support 22 that has a hole 24 therethrough. A spout or hollow tube 26 extends into said hole 24, opposite ends of which project beyond the latter, and at one end said spout has a sharp or penetrating portion 28 and at the opposite end is a discharge portion 29. Intermediate the ends of said spout 26 is a collar 30 that bears against said spout support 22 and next to said collar is a rubber sealing member 32 which bears against the side of said container to seal around the opening made in the latter by said penetrating portion 28.

Pivotally attached to said mounting member 20 is a lever 34 having a cam-shaped end 36 that overlies said spout penetrating portion 28 in normal position, and it also has a hole 38 intermediate the ends thereof which alines with a hole 40 in said mounting member 20. A connecting pin or rivet 42 extends through said hole 38 and permits a rotative movement of said lever 34 when desired. At the free end of said lever is an angularly extending retainer 44 that extends upwardly in position of use.

My device has a fastener member 46 shown as an elongate bolt that extends through a hole 48 in said leg 14 and also to and through a hole 50 in said leg 16. Said bolt 46 has a screw-threaded portion 52 at one end which extends outside of said leg 16 and receives a tightening member such as a wing nut 54 to thereby firmly tighten my device on a can or container C the top of which is of rectangular shape in plan view.

In use, my device, as shown in said FIG. 3, is placed on the top of a container C with said gripping lip 18 resting on said top near one side thereof, just inside of the top bead of the container, with said lever 34 extending laterally outward. Said spout support 22 is outside of the container C next to a side thereof that is opposite the above-mentioned side, while said lever cam-shaped end 36 is inwardly of the top bead or rim 58 of said container. The free ends of said lever 34 is swung towards the outer end of said bolt 46 which brings said cam end 36 into contact with the latter-mentioned container bead 58. Continued movement of said lever draws said spout penetrating portion 28 against the adjacent side of the container until it pierces the latter and extends into the interior of the container, as shown, in said FIG. 2, which is normal position.

The gripping lip 18 and leg 16 rises, or may be lightly lifted, as said lever cam-shaped end presses against said container top bead, and said lip 18 moves to the outside of, and against the bead R, as shown in said FIG. 4. Then said wing nut 52 is screwed on said threads 52 to a tight position against said handle leg 16 thus firmly holding my device to the container with the spout extending outside the latter, through which the contents may be poured when the container is tipped.

Said bolt 46 is forced slightly downward as the tightening action proceeds and it comes into contact with said retainer 44 thus maintaining the bolt in frictional contact therewith and maintaining the lever directly under said grasping portion 12.

What I claim is:

1. A handle and spout device for containers having a rim portion, said device comprising a holder, said holder having a handle portion, a leg depending from each end of said handle portion, a mounting member extending from one of the said legs outwardly beyond said holder, a support extending angularly from said mounting member, a spout attached to said support and extending therethrough, said spout embodying a penetrating portion at one side of said support and spaced from said mounting member and a discharge portion at an opposite side of said support, a lever pivotally attached to said mounting member having a cam portion at one end thereof adapted to grip said rim portion and which overlies said spout penetrating end portion and is spaced from said support and normally is in the space between said penetrating portion and said mounting member, a fastener member attached to and extending between said legs, and means at the end of the other said leg adapted to grip said container.

2. A handle and spout device for containers as set forth in claim 1, and having means outside of one of said legs connected with said fastener member and adapted to tightly hold the latter between said two legs.

3. A handle and spout device for containers as set forth in claim 1 in which said means comprises a gripping lip.

4. A handle and spout device for containers as set forth in claim 1 and embodying a screw-threaded nut outside of one of said legs and in which said fastener member has a screw-threaded end portion that extends through the latter said leg and connects with said nut.

5. A handle and spout device for containers as set forth in claim 1 in which said lever embodies a retainer directly below said fastener member and extends upwardly and in contact with the latter in normal position.

6. A handle and spout device for containers as set forth in claim 1 in which said cam portion is directly under said mounting member in normal position and in which said spout penetrating portion is directly under and spaced from said cam portion.

References Cited by the Examiner

UNITED STATES PATENTS

| | | | |
|---|---|---|---|
| 948,787 | 2/1910 | Luttich | 16—114 |
| 2,203,156 | 6/1940 | Kahn | 222—83 |
| 2,288,359 | 6/1942 | Jenkins | 16—114 |

LOUIS J. DEMBO, *Primary Examiner.*

RAPHAEL M. LUPO, *Examiner.*